United States Patent [19]
Naito et al.

[11] Patent Number: 5,023,876
[45] Date of Patent: Jun. 11, 1991

[54] METHOD AND APPARATUS FOR DETECTING FINALLY RECORDED SECTOR

[75] Inventors: Ryuichi Naito; Tsuneo Ishii, both of Saitama, Japan

[73] Assignee: Pioneer Electronic Corporation, Tokyo, Japan

[21] Appl. No.: 265,165

[22] Filed: Oct. 31, 1988

[51] Int. Cl.⁵ .............................................. G11B 20/18
[52] U.S. Cl. .................. 371/40.1; 360/72.2; 369/57; 369/58; 371/51.1
[58] Field of Search ............. 371/37.1, 40.1, 40.4, 371/51.1; 360/49, 53, 72.1, 72.2, 48; 369/52, 53, 58, 57

[56] References Cited
U.S. PATENT DOCUMENTS

| | | | |
|---|---|---|---|
| 4,788,685 | 11/1988 | Sako et al. | 360/49 X |
| 4,800,549 | 1/1989 | Yamagami et al. | 369/56 |
| 4,811,124 | 3/1989 | Dujari et al. | 360/49 |
| 4,821,254 | 4/1989 | Satoh et al. | 369/54 |

*Primary Examiner*—Stephen M. Baker
*Attorney, Agent, or Firm*—Sughrue, Mion, Zinn, Macpeak & Seas

[57] ABSTRACT

In a finally recorded sector detecting system suitable for a write-once type optical disc device, an error correction code or error detection code provided for each index sector is utilized to detect a state of errors occurring in reproduced index signals, and a finally recorded index sector is determined from the state of errors thus detected.

13 Claims, 2 Drawing Sheets

| REGION A | $I_1$ | $I_2$ | $I_3$ | $I_4$ | $I_{5(i5)}$ | $I_{6(i5)}$ | $I_{7(i7)}$ | $I_{8(i7)}$ | $I_9$ | $I_{10}$ | |
|---|---|---|---|---|---|---|---|---|---|---|---|
| REGION B | $I'_1$ | $I'_2$ | $I'_3$ | $I'_4$ | $I'_{5(i5)}$ | $I'_{6(i5)}$ | $I'_{7(i7)}$ | $I'_{8(i7)}$ | $I'_9$ | $I'_{10}$ | |

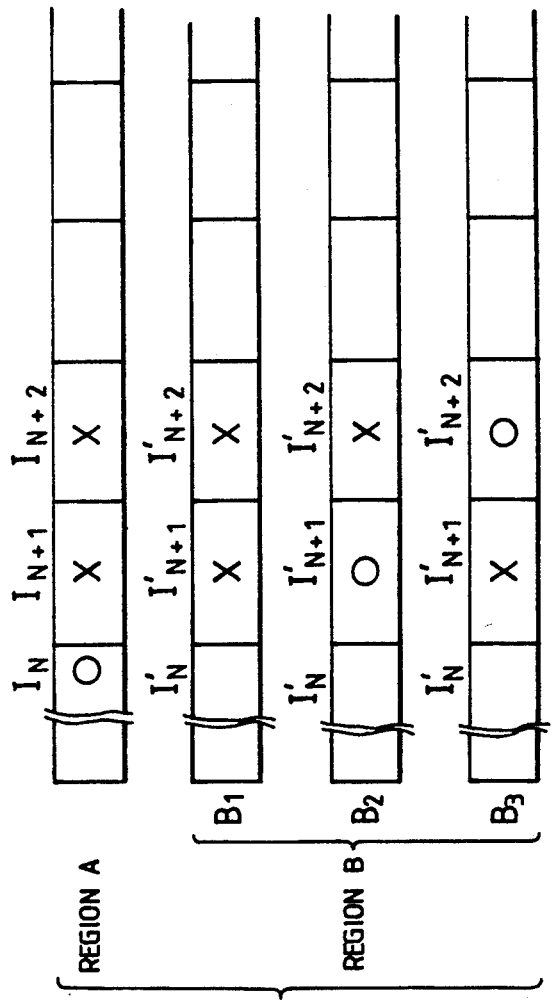

METHOD AND APPARATUS FOR DETECTING FINALLY RECORDED SECTOR

BACKGROUND OF THE INVENTION

This invention relates to a finally recorded sector detecting system, which is especially suitable for a "write-once" type optical disc device or the like.

FIG. 5 is an explanatory diagram schematically showing recording regions of a conventional write-once type optical disc. That is, in general, the optical disc has an index region and a data region as shown in FIG. 5. A user can record desired data files on sectors ($D_1$, $D_2$, $D_3$, $D_4$, $D_5$, ...) in the data region When the files are recorded, index signals corresponding to the files are successively recorded on sectors ($I_1$, $I_2$, ...) in the index region. Therefore, the latest index signal of the data signal recorded on the disc can be obtained by reading the finally recorded sector ($I_2$ in the case of FIG. 5) in the index region.

In order to detect the finally recorded sector, heretofore, the amplitude of an RF signal which is obtained by successively reproducing the index signals in the index region is monitored. That is, when a level of the RF signal becomes lower than a predetermined reference value, it is determined that the sector which exists immediately before the sector of the RF signal level change is the finally recorded sector.

That is, in the conventional method, the finally recorded sector is detected from the RF signal level, and therefore the detection of the finally recorded sector is liable to be adversely affected by noises in non-recorded sectors, with a result that the finally recorded sector is not correctly detected.

Furthermore, in the conventional method, even if the index signal written on the finally recorded sector is incorrect, it cannot be detected, and therefore an incorrect index signal may be read out. As a result, it is sometimes the case that a new data signal may be written on the sector on which a data signal has already been recorded, thus erasing the latter data signal.

SUMMARY OF THE INVENTION

Accordingly, an object of this invention is to eliminate the above-described difficulties accompanying a conventional finally recorded sector detecting system.

More specifically, an object of the invention is to provide a finally recorded sector detecting system in which a finally recorded sector can be detected with higher accuracy, and the reading of incorrect index signal can be prevented.

The foregoing object and other objects of the invention have been achieved by the provision of a finally recorded sector detecting system in which, according to the invention, a recording medium on which a data signal has been recorded with an error code, such as an error correction code or error detection code being added to an index signal in each index sector is subjected to reproduction. The error code is utilized to detect a state of errors occurring in a reproduced index signal. When the state of errors thus detected does not meet a predetermined reference condition at a certain sector, the sector existing immediately before that sector is detected as a finally recorded sector.

The nature, principle and utility of the invention will become more apparent from the following detailed description when read in conjunction with the accompanying drawings.

BRIEF DESCRIPTION OF THE DRAWINGS

In the accompanying drawings:

FIGS. 1 to 3 are explanatory diagrams showing index regions on a disc according to a finally recorded sector detecting system of this invention;

DETAILED DESCRIPTION OF THE PREFERRED EMBODIMENTS

Figure 4:
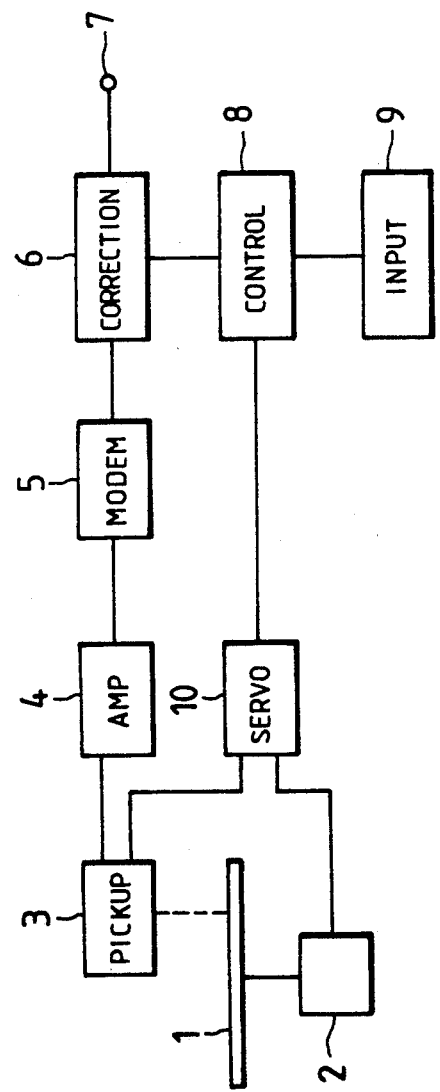
FIG. 4 is a block diagram showing the arrangement of an optical disc device practicing the finally recorded sector detecting system of the invention.
Figure 5:
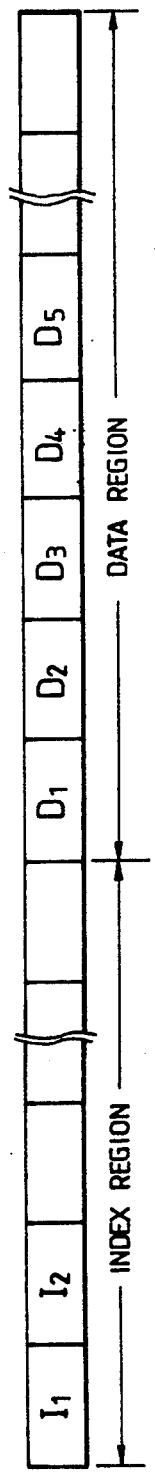
FIG. 5 is an explanatory diagram showing regions on a conventional disc.

First, a write-once type optical disc device to which a finally recorded sector detecting system according to this invention is applied will be described with reference to FIG. 4.

In response to a data recording instruction from inputting means 9, a control circuit 8 consisting of a microcomputer, etc. controls a servo circuit 10 so that a disc 1 is rotated by a spindle motor 2. Under this condition, the control circuit 8 moves a pickup 3 to an index region of the disc with the aid of the servo circuit 10, and detects a finally recorded sector in a manner described later. The control circuit 8 reads out an index signal written on the finally recorded sector, and determines from the data thus read out an address in a data region where a next data signal should be recorded.

After that, a recording data signal is applied through a terminal 7 to a correction circuit 6, where it is suitably processed, i.e., interleaved, an error correction code is added to it, etc. An output of the correction circuit 6 is applied to a modem (modulator-demodulator) circuit 5, where it is subjected, for instance, to $M^2$ modulation. An output signal of the modem circuit 5 is applied through an amplifier circuit 4 to the pickup 3. In response to the input signal, the pickup 3 controls, for instance, a laser beam which is applied to the disc 1, as a result of which the data signal is recorded on the predetermined sector in the data region.

Immediately after the data recording operation, the control circuit 8 carries out a "verification read" operation; that is, the control circuit 8 controls the position of the pickup 3 with the aid of the servo circuit 10 thereby to produce the data signal thus recorded. The reproduced data signal outputted from the pickup 3 is amplified by the amplifier circuit 4 and subjected to $M^2$ $pl$ demodulation in the modem circuit 5. An output signal of the modem circuit 5 is applied on the correction circuit 6, where it is subjected to error correction, deinterleaving, etc. In the case where errors in the reproduced data signal cannot be corrected, or the number of errors in the reproduced data signal is more than a predetermined reference value, the control circuit 8 operates to record the same data signal in a replacement region in the data region.

When the desired data signal has been recorded in the data region (including the replacement region) in the above-described manner, the control circuit 8 controls the servo circuit 10 to move the pickup 3 to the sector next to the finally recorded sector in the index region, and controls the correction circuit 6 to produce and record an index signal corresponding to the recorded data signal.

As shown in FIG. 1, the index region of the disc 1 is divided into a plurality of regions (two regions A and B in the case of FIG. 1). If it is assumed that an index signal has been recorded on a sector $I_4$ in the region A and on a sector $I'_4$ in the region B which "corresponds in position" to the sector $I_4$ (i.e., the sectors $I_4$ and $I'_4$ are the finally recorded sectors), then a new index signal is recorded on the next sectors $I_5$ and $I'_5$. Herein, the "correspondence" between the sectors $I_4$ and $I'_4$ means that these sectors exist at the positions apart from the respective first sectors $I_1$ and $I'_1$ by the same number.

When an index signal $i_5$ has been recorded on the sector $I_5$ in the region A and on the sector $I'_5$ in the region B, the control circuit 8 operates so that the recorded index signal is immediately read out for verification similar to the above-described case. In the index signal $i_5$, similarly as in the case of the data signal, the error code such as an error correction code like a Reed-Solomon code, or an error detection code like CRC is provided for each sector. The correction circuit 6 uses the error correction code, etc. to detect the state of errors in the reproduced index signal $i_5$. For instance, when errors occurring in the sector $I_5$ cannot be corrected or the number of errors is more than the reference value, that is, when the reproduced index signal does not meet the predetermined reference condition for the verification read operation (which may be stricter than that for the normal reproduction operation), the same index signal $i_5$ is recorded on the following sectors $I_6$ and $I'_6$.

The index signal $i_5$ recorded on the sectors $I_6$ and $I'_6$ is also read out for the verification. When it is determined that the states of errors of the signals recorded on the two sectors meet the reference condition, then the index signal recording operation is ended.

For instance, when an index signal $i_7$ recorded on a sector $I_7$ in the region A meets the verification read reference condition, but the same index signal $i_7$ recorded on the corresponding sector $I'_7$ in the region B does not meet, the same index signal $i_7$ is again recorded on the following sectors $I_8$ and $I'_8$ in the regions A and B, respectively. In this manner, the operation of recording the same index signal on sectors which correspond in positional relationship to each other in the regions A and B is repeatedly carried out until the index signals recorded in both regions meet the verification read reference condition.

In the above-described embodiment, the region A and region B are separated from each other and each region consists of continuous sectors; however, the invention is not limited thereto. For instance, as shown in FIG. 2, the regions A and B may be mixed to form one index region. That is, sectors with odd sector numbers ($I_1$, $I_2$, ...) form the region A and sectors with even sector numbers ($I'_1$, $I'_2$, ...) form the region B.

As was described above, the same index signal is recorded on a plurality of corresponding sectors Therefore, when the index signal in one of the regions is deteriorated, the index signal in another region can be used.

In the case where the same index signal is recorded on corresponding sectors in a plurality of regions, the finally recorded sector can be detected as follows.

The control circuit 8 controls the servo circuit 10 to cause the pickup 3 to sequentially reproduce the sectors in one region (for instance the region A). In this operation, the control circuit 8 receives the output of the correction circuit 6 to monitor the state of errors occurring with each sector, thereby to determine whether or not the state of errors meets the predetermined reference condition.

With a sector where no index signal is recorded, the correction of errors is impossible (in the case where the error correction code is used) or the presence of errors is detected (in the case where the error detection code is used). Therefore, the sector where no index signal is recorded can be detected by employing such as basis of judgment, that is, by determining that the correction of errors is impossible or errors are detected. The finally recorded sector is determined to be a sector just before the sector thus detected.

In the case where length signal which indicates the length of the index region is recorded on a predetermined sector in the index region, the length signal is first read out. Then, the pickup 3 is moved to the middle of the index region, and it is determined whether or not index signals have been recorded on the sectors near it. When it is determined that the index signal has been recorded on one of the sectors, a recorded position and a recording state of a sector which is located backwardly from that sector by a half ($\frac{1}{2}$) of the distance between the sector and the end sector are detected; whereas when it is determined that no index signal has been recorded on one of the sectors, the recording state of a sector which is located forwardly from that sector by the half ($\frac{1}{2}$) is detected. The above-described detection is repeatedly carried out until the finally recorded sector is detected. In this method, the finally recorded sector can be detected more quickly than in the above-described case.

However, it is sometimes the case that although an index signal has been recorded on a sector, for instance because of noise, the sector may be detected as a sector (or "non-recorded sector") which does not meet the reference condition. This difficulty is eliminated as follows: As shown in FIG. 3, the region A is reproduced until n sectors (two sectors in FIG. 3) which do not meet the reference condition (indicated by "x" in FIG. 3) are continuously detected after the sector which meets the reference condition (indicated by "O" in FIG. 3) has been detected. When two Sectors $I_{N+1}$ and $I_{N+2}$ which do not meet the reference condition are continuously detected, corresponding two sectors $I'_{N+1}$ and $I'_{N+2}$ in the region B are reproduced. The value n is so determined that, for instance in the case of a device in which in a data recording operation no data is recorded in a sector whose sector address cannot be read out, the probability that n sectors whose sector addresses cannot be read out occur continuously, becomes sufficiently small.

When none of the two sectors $I'_{N+1}$ and $I'_{N+2}$ meet the reference condition (as shown in a Case $B_1$ in FIG. 3), the sectors $I_N$ and $I'_N$ located immediately before the respective sectors $I_{N+1}$ and $I'_{N+1}$ are detected finally recorded sectors. If the probability that a sector where an index signal has been recorded is detected as a non-recorded sector is represented by P, then the probability that although sectors $I_{N+1}$ and $I'_{N+1}$ are the finally recorded sectors, sectors $I_N$ and $I'_N$ are erroneously detected as the finally recorded sectors, will be $P^2$, thus being considerably small.

In the case where only one of the corresponding sectors $I'_{N+1}$ and $I'_{N+2}$ in the region B meets the reference condition (as indicated in cases $B_2$ or $B_3$ in FIG. 3), that sector is detected as the finally recorded sector. (In the case where the value n is set to more than three, the last sector in the data recording direction in the region (not in the direction of rotation) is detected as the finally recorded sector.

As was described above, the finally recorded sector has been so processed as to meet the reference condition in all the regions (both in the region A and in the region B). Therefore, the finally recorded sectors will be correctly detected unless they are erroneously detected at once as not meeting the reference condition.

This invention is also applicable to recording media in which data signal can be erased and re-written.

As was described above, in the finally recorded sector detecting system of the invention, the recording medium on which the data signal has been recorded with the error code. Such as the error correction code or error detection code being added to the index signal in each sector, is subjected to the index signal reproduction, and the state of errors of the reproduced index signal is detected by using the error code, so that when the state of errors of a sector does not meet the predetermined reference condition, the sector occurring immediately before that sector is detected as the finally recorded sector. Therefore, with the finally recorded sector detecting system of the invention, the finally recorded sector can be detected with high accuracy. In the case where the same data is recorded in a plurality of sectors, and in one of the sectors the index signal is deteriorated, thus providing errors or the errors not being able to be corrected, the remaining sectors can be detected as the finally recorded sectors.

We claim:

1. An apparatus for detecting a finally recorded index sector of a recording medium, comprising:
   recording means by which a data signal and an index signal are recorded on said recording medium in a data sector in a data region and an index sector in an index region, respectively, an error code being added to each index signal, wherein a finally recorded index sector satisfies a first predetermined reference condition;
   first means for successively reproducing said index signals;
   second means for detecting errors in each of said reproduced index signals by utilizing said error code included therein; and
   third means for recognizing as said finally recorded index sector an index sector existing just before a first non-recorded index sector in response to detecting said first non-recorded index section being a first sector not satisfying a second predetermined reference condition.

2. An apparatus as claimed in claim 1, wherein said recording medium is a write-once type optical disc.

3. An apparatus as claimed in claim 1, wherein said error code is an error correction code.

4. An apparatus as claimed in claim 1, wherein said error code is an error detection code.

5. An apparatus as claimed in claim 1, wherein a same index signal is recorded in a plurality of index sectors in different index regions.

6. An apparatus for detecting a finally recorded index sector of a recording medium, comprising:
   recording means by which a data signal and an index signal are recorded on said recording medium in a data sector in a data region and an index sector in an index region, respectively, an error code being added to each index signal, wherein a finally recorded index sector satisfies a first predetermined reference condition;
   first means for successively reproducing said index signals;
   second means for detecting errors in each of said reproduced index signals by utilizing said error code included therein;
   third means for recognizing as said finally recorded index sector an index sector existing just before a first non-recorded index sector, said first non-recorded index sector being a first sector detected as not satisfying a second predetermined reference condition;
   wherein a same index signal is recorded in a plurality of index sectors in different index regions; and
   wherein said index sector existing just before said first non-recorded index sector is recognized as said finally recorded index section in response to detecting all of a plurality of first non-recorded index sectors in said different index regions as not satisfying said second predetermined reference condition in said respective index regions.

7. An apparatus for detecting a finally recorded index sector of a recording medium, comprising;
   recording means by which a data signal and an index signal are recorded on said recording medium in a data sector in a data region and an index sector in an index region, respectively, an error code being added to each index signal, wherein a finally recorded index sector satisfies a first predetermined reference condition;
   first means for successively reproducing said index signals;
   second means for detecting errors in each of said reproduced index signals by utilizing said error code included therein;
   third means for recognizing as said finally recorded index sector an index sector existing just before a first non-recorded index sector, said first non-recorded index sector being a first sector detected as not satisfying a second predetermined reference condition;
   wherein a same index signal is recorded in a plurality of index sectors in different index regions; and
   wherein said index sector just before said first non-recorded index sector is recognized as said finally recorded index sector in response to detecting a predetermined number of continuous, non-recorded index sectors as not satisfying said second predetermined reference condition in every index region.

8. An apparatus for detecting a finally recorded index sector of a recording medium, comprising:
   recording means by which a data signal and an index signal are recorded on said recording medium in a data sector in a data region and an index sector in an index region, receptively, an error code being added to each index signal, wherein a finally recorded index sector satisfies a first predetermined reference condition;
   first means for successively reproducing said index signals;
   second means for detecting errors in each of said reproduced index signals by utilizing said error code included therein;
   third means for recognizing as said finally recorded index sector an index sector existing just before a first non-recorded index sector in response to detecting said first non-recorded index sector being a first sector not satisfying a second predetermined reference condition;

wherein said recording medium has further recorded thereon a length signal for indicating length of said index region in a prescribed index sector in said index region;

said first means further reproduces said length signal; and said second means detects said errors further on the basis of a produced length signal.

9. A method for detecting a finally recorded index sector of a recording medium on which a data signal and an index signal are recorded in a data sector in a data region and an index sector in a index region, respectively, an error code being added to each index signal, and said finally recorded index sector satisfying a first predetermined reference condition, said method comprising the steps of:

reproducing said index signals successively;

detecting errors in each of said reproduced index signals by utilizing said error code included therein; and recognizing as said finally recorded index sector an index sector existing just before a first non-recorded index sector in response to detecting said first non-recorded index sector being a first sector not satisfying a second predetermined reference condition.

10. A method as claimed in claim 9, wherein a same index signal is recorded in a plurality of index sectors in different index regions.

11. A method for detecting a finally recorded index sector of a recording medium on which a data signal and an index signal are recorded in a data sector in a data region and an index sector in an index region, respectively, an error code being added to each index signal, and said finally recorded index sector satisfying a first predetermined reference condition, said method comprising the steps of:

reproducing said index signals successively;

detecting errors in each of said reproduced index signals by utilizing said error code included therein; and recognizing as said finally recorded index sector an index sector existing just before a first non-recorded index sector, said first non-recorded index sector being a first sector detected as not satisfying a second predetermined reference condition;

wherein a same index signal is recorded in a plurality of index sectors in different index regions; and wherein said recognizing step, said index sector just before said first non-recorded index sector is recognized as said finally recorded index sector in response to detecting all of a plurality of fist non-recorded index sectors in said different index regions as not satisfying said second predetermined reference condition in said respective index regions.

12. A method for detecting a finally recorded index sector of a recording medium on which a data signal and an index signal are recorded in a data sector in a data region and an index sector in an index region, respectively, an error code being added to each index signal, and said finally recorded index sector satisfying a first predetermined reference condition, said method comprising the steps of:

reproducing said index signals successively;

detecting errors in each of said reproduced index signals by utilizing said error code included therein; and recognizing as said finally recorded index sector an index sector existing just before a first non-recorded index sector, said first non-recorded index sector being a first sector detected as not satisfying a second predetermined reference condition;

wherein a same index signal is recorded in a plurality of index sectors in different index regions;

wherein in said recognizing step, said index sector just before said fist non-recorded index sector is recognized as said finally recorded index sector in response to detecting a predetermined number of continuous, non-recorded sectors as not satisfying said second predetermined reference condition in every index region.

13. A method for detecting a finally recorded index sector of a recording medium on which a data signal and an index signal are recorded in a data sector in a data region and an index sector in an index region, respectively, an error code being added to each index signal, and said finally recorded index sector satisfying a first predetermined reference condition, said method comprising the steps of:

reproducing said index signals successively;

detecting errors in each of said reproduced index signals by utilizing said error code included therein; and recognizing as said finally recorded index sector an index sector existing just before a first non-recorded index sector in response to detecting said first non-recorded index sector being a first sector not satisfying a second predetermined reference condition;

wherein said recording medium has further recorded thereon a length signal for indicating length of said index region in a prescribed index sector in said index region;

said method further comprises the step of reading out said length signal; and errors are detected on the basis of a readout length signal in said detecting step.

* * * * *